United States Patent [19]

Rossio

[11] 4,050,575
[45] Sept. 27, 1977

[54] BELT CONVEYOR

[75] Inventor: John H. Rossio, Kalamazoo, Mich.

[73] Assignee: LaRos Equipment Company, Inc., Portage, Mich.

[21] Appl. No.: 666,343

[22] Filed: Mar. 12, 1976

[51] Int. Cl.² .............................................. B65G 23/06
[52] U.S. Cl. ................................ 198/834; 198/688; 198/840; 198/841; 198/860
[58] Field of Search ................. 198/113, 114, 115, 193, 198/202, 203, 182, 607, 688, 699, 804, 832, 834, 841, 846, 854, 864, 840, 860; 74/231 C

[56] References Cited

U.S. PATENT DOCUMENTS

| | | | |
|---|---|---|---|
| 1,090,670 | 3/1914 | Zimmerman | 198/114 |
| 1,855,808 | 4/1932 | Schwan | 198/202 |
| 2,393,563 | 1/1946 | Petterson | 198/203 |
| 2,404,629 | 7/1946 | Griff | 198/607 |
| 2,413,339 | 12/1946 | Stadelman | 198/182 |
| 2,538,242 | 1/1951 | Hannon | 198/203 X |
| 3,051,295 | 8/1962 | Moy | 198/115 |
| 3,245,518 | 4/1966 | Reibel et al. | 198/198 |
| 3,265,193 | 8/1966 | Bessant | 198/182 |
| 3,275,117 | 9/1966 | Weigel | 198/113 |
| 3,368,662 | 2/1968 | Poerink | 198/182 |
| 3,572,498 | 3/1971 | Hammitt | 198/182 |

FOREIGN PATENT DOCUMENTS

| | | | |
|---|---|---|---|
| 1,939,381 | 2/1971 | Germany | 74/231 C |

Primary Examiner—John J. Love
Assistant Examiner—Richard K. Thomson
Attorney, Agent, or Firm—Blanchard, Flynn, Thiel, Bautell & Tanis

[57] ABSTRACT

A belt-type conveyor having an endless belt supported on a pair of spaced end rollers. The upper reach of the belt is adapted to have articles supported thereon for transporting thereof. A drive system is interconnected to both end rollers to simultaneously rotatably drive same, which end rollers in turn drive the belt. This drive system permits the upper reach of the belt to be maintained relatively free of tension so that the upper reach will readily conform to a guide structure which is positioned thereunder for slidably supporting same. The conveyor is particularly suitable for use as an inclined conveyor to permit lifting of articles on the upper belt reach, which upper reach can be bent upwardly from a horizontal position without requiring top guide rails or other hold-down devices.

11 Claims, 6 Drawing Figures

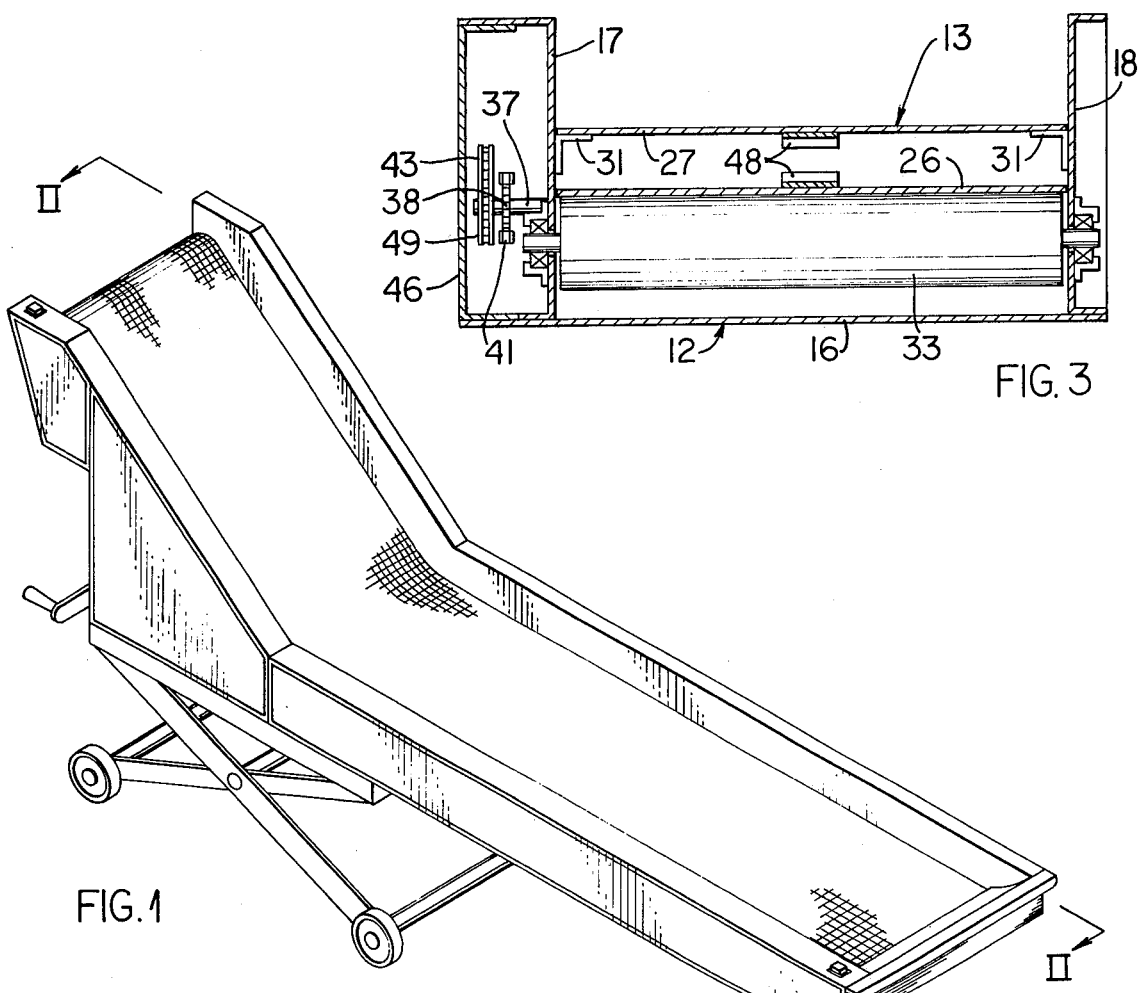
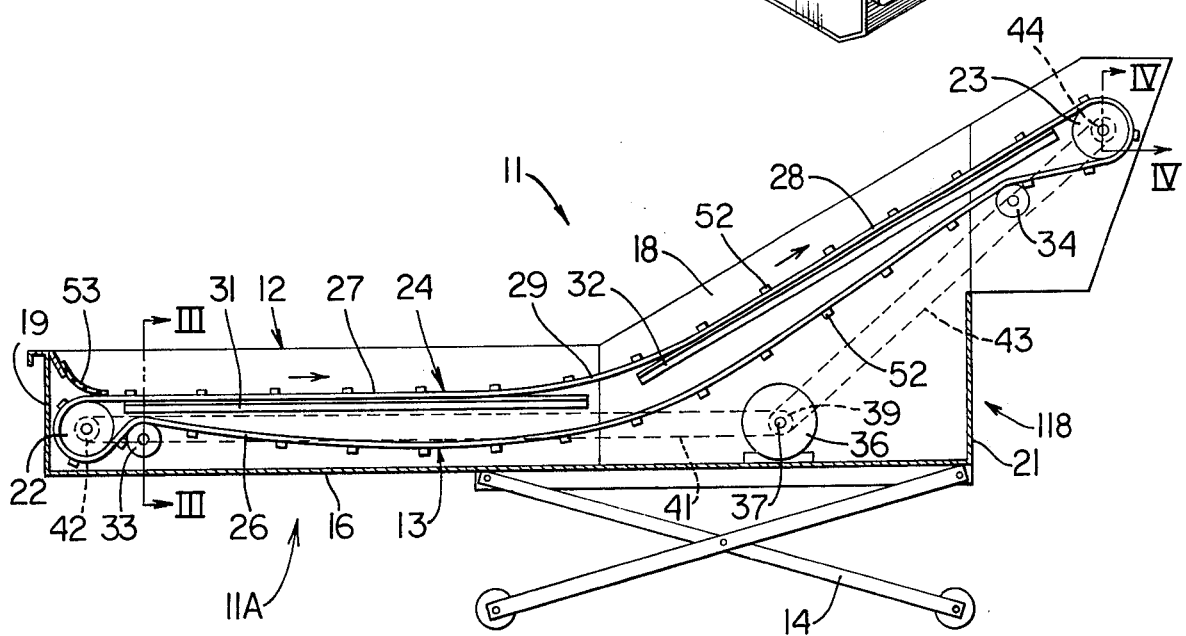

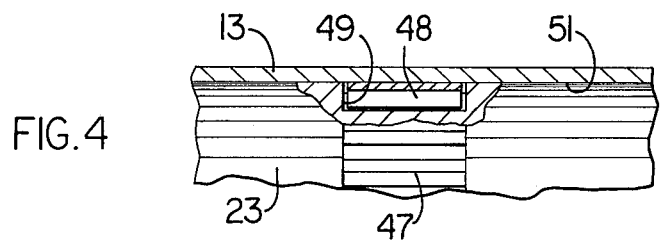
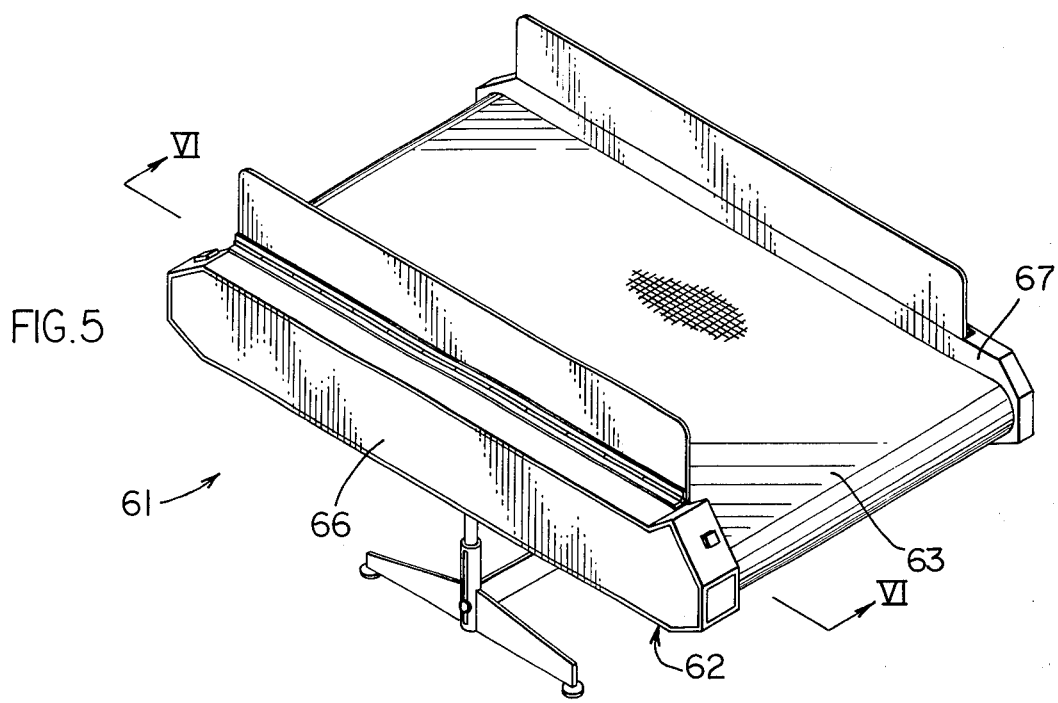
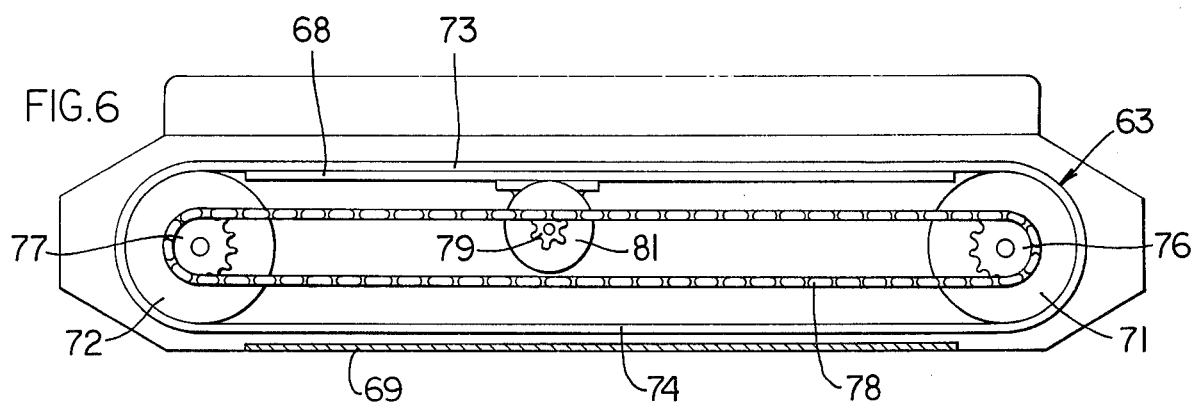

BELT CONVEYOR

FIELD OF THE INVENTION

This invention relates to an improved belt-type conveyor and, in particular, a conveyor suitable for use as an inclined conveyor.

BACKGROUND OF THE INVENTION

Belt-type conveyors are utilized extensively for transferring articles or objects from one station to another. In such conveyors, there is normally provided an endless belt trained around a pair of end rollers, with additional intermediate idler or tensioning rollers also being provided. The upper reach of the belt is normally utilized for supporting the articles being transferred. In some conveyors, normally referred to as horizontal belt conveyors, the upper belt reach extends substantially horizontally and thus merely transfers the objects between two different horizontally spaced stations. Other conveyors, normally referred to as inclined conveyors, have at least a part of the upper belt reach extending upwardly at an angle with respect to the horizontal so as to permit a vertical lifting of the articles as they are transported between two working stations.

In these known conveyors, the drive is normally connected to only one of the end rollers so that the belt is thus under a substantial tension in order to effect operation of the conveyor. Because of the tension in the belt, it is necessary for the conveyor to be provided with complex alignment structure, associated with both the belt and the roller, so as to permit proper tracking of the belt. If the rollers and belts are not properly aligned, then the tension in the belt causes the belts to continually move sidewardly of the rollers so that the side edges of the belt rub against the guide structure, thereby resulting in excessive wear. The tension in the belt thus makes the overall conveyor more complex by requiring costly alignment structure, and additionally makes setup and operation more difficult in view of the necessity of having this structure precisely adjusted. Since this is difficult to accomplish, undesirable wear of the belt is normally encountered during usual operation of such conveyors.

In addition to the above problems, belt conveyors of the inclined type possess still further structural and operational disadvantages. Particularly, in inclined conveyors wherein the upper belt reach has a portion projecting horizontally and a further portion inclined upwardly, it is necessary to provide guide structure throughout the curve (the junction) between the horizontal and inclined portions) in order to maintain the desired curvature of the upper belt reach. Absent this guide structure, which normally comprises guide rails disposed for engagement with the upper side edges of the belt, the proper curvature of the belt can not be maintained in view of the large tension which exists in the belt. The use of these top guide rails is, however, undesirable in view of the excessive rubbing and wear which they cause on the belt. In addition to the top guide rails, it has also often been necessary to provide an additional control roller at the curve in order to maintain the belt in the desired path, but this control roller greatly restricts the applicability of the conveyor for many uses.

Because of the excessive belt tension required in these known belt conveyors, a problem of bowing of the belt across the width thereof has also been experienced. To overcome this problem, it has been conventional to provide cross rails on the belt so as to strengthen same and prevent bowing. This not only increases the cost and complexity of the belt, but also increases the complexity of driving and controlling the belt.

Accordingly, it is an object of the present invention to provide an improved belt conveyor which overcomes the above-mentioned disadvantages. More specifically, the belt conveyor of this invention includes a drive arrangement which is connected to and simultaneously drives both of the end rollers which support the belt so that the belt is maintained with little, if any, tension therein during operation of the system.

Another object of this invention is to provide an improved belt conveyor, as aforesaid, which minimizes the problem of belt tracking and excessive belt wear, and which also eliminates the need for complex and costly alignment structure due to the belt being maintained in a condition wherein it is substantially free of tension.

Still another object of this invention is the provision of a belt conveyor, as aforesaid, which is particularly desirable for use as an inclined conveyor wherein the belt can be deflected from a horizontal position into an upwardly inclined position without requiring any top guide rails or other top control rollers at or throughout the curve between the horizontal and inclined portions of the belt.

A further object of this invention is an improved belt conveyor, as aforesaid, which is simple to manufacture and assemble, which is of minimum cost and mechanical complexity, which operates in an efficient manner while requiring minimum adjustment and maintenance, which is suitable for use as either a horizontal or inclined conveyor, and which permits the use of either a friction or a toothed drive between the rollers and belt depending upon the magnitude of the transported load and/or the angle of inclination.

In the belt conveyor of this invention, the belt extends between a pair of end rollers which support the upper reach of the belt so that same extends horizontally or, in the alternative, a part of this upper reach is inclined upwardly. The pair of end rollers are simultaneously driven from a common drive source so that the upper belt reach is maintained in a virtually tensionless condition. The upper reach of the belt, when a portion thereof is inclined, is supported on horizontal guide members positioned beneath the upper reach, and the curved portion of the upper reach is supported solely by said guide members. A toothed driving arrangement can be provided between the rollers and the belt to prevent slippage therebetween, which toothed drive arrangement additionally functions as an alignment structure to ensure proper alignment of the belt on the rollers.

Other objects and purposes of this invention will be apparent to persons familiar with structures of this type upon reading the following specification and inspecting the accompanying drawings.

BRIEF DESCRIPTION OF THE DRAWINGS

FIG. 1 is a perspective view of an inclined conveyor according to the present invention.

FIG. 2 is a side elevational view taken along the line II—II in FIG. 1.

FIG. 3 is an enlarged, fragmentary sectional view taken along line III—III in FIG. 2.

FIG. 4 is an enlarged, fragmentary sectional view taken along line IV—IV in FIG. 2.

FIG. 5 is a perspective view of a horizontal conveyor according to the present invention.

FIG. 6 is a side elevational view taken along the line VI—VI in FIG. 5.

Certain terminology will be used in the following description for convenience in reference only and will not be limiting. For example, the words "upwardly", "downwardly", "leftwardly" and "rightwardly" refer to directions in the drawings to which reference is made. The word "forwardly" refers to the normal direction of movement of articles by the conveyor belt, which movement occurs from right to left in FIG. 1. The words "inwardly" and "outwardly" refer to directions toward and away from, respectively, the geometric center of the conveyor and designated parts thereof. Said terminology includes the words specifically mentioned, derivatives thereof and words of similar import.

DETAILED DESCRIPTION

FIGS. 1 and 2 illustrate a belt conveyor 11 which includes a horizontal conveyor section 11A and an inclined conveyor section 11B. The conveyor 11 has a housing 12 on which is supported an endless conveyor belt 13. The housing is, in the illustrated embodiment, supported on an adjustable scissor lift 14 so that the position of the conveyor can be selectively adjusted.

The housing 12 is illustrated as being of an upwardly opening boxlike configuration and includes a bottom wall 16 and a pair of upwardly projecting parallel sidewalls 17 and 18. The opposite ends of the housing are closed by a front wall 19 and a rear wall 21. The endless belt 13 is supported on and extends between a pair of axially elongated cylindrical end rollers 22 and 23, which rollers extend between the sidewalls 17 and 18 and are rotatably supported thereon, as by conventional bearings. The end rollers 22 and 23 are disposed with their axes extending in parallel horizontal relationship. Belt 13 has upper and lower belt reaches 24 and 26, respectively, which reaches extend between the rollers 22 and 23. The upper belt reach 24 includes a horizontal belt portion 27 which is adjacent the inlet end of the conveyor, an inclined belt portion 28 which is at the discharge end of the conveyor, and an intermediate curved belt portion 29 which joins the horizontal and inclined portions 27 and 28, respectively.

The horizontal belt portion 27 is slidably supported on a pair of horizontally elongated guide rails 31 which, as shown in FIG. 3, are of an L-shaped configuration and are fixed to the sidewalls 17 and 18. The inclined belt portion 28 is similarly slidably supported by a pair of elongated guide rails 32 which are inclined upwardly at the desired inclination. The guide rails 32, like the guide rails 31, are of an L-shaped cross section and are fixedly secured to the opposite sidewalls 17 and 18.

As described above, the upper left reach 24 is supported solely by the guide rails 31 and 32, which guide rails support the upper belt reach solely by slidably engaging the underside of the belt. Thus, the complete upper reach 24 does not have any guide structure disposed in engagement with the upper surface thereof, and in fact the curved belt portion 29 is free of any guiding support.

The lower belt reach 26 is maintained in a curved configuration which results from the belt being maintained in a suspended condition over a major portion of the length thereof. However, a pair of cylindrical idler rollers 33 and 34 are rotatably supported on the sidewalls of the housing and are positioned for engaging the lower belt reach. The rollers 33 and 34 are disposed closely adjacent the end rollers 22 and 23, respectively, whereby they ensure that the belt extends around the end rollers and is driven by a motor 36, such as an electric motor.

The motor 36 is positioned within the housing, as by being mounted on the bottom wall 16 beneath the inclined portion of the belt. Motor 36 has the shaft 37 thereof projecting outwardly from one side of the housing, which motor shaft 37 has drive sprockets 38 and 39 fixedly secured thereto. Drive sprocket 38 is in driving engagement with a first chain 41, which in turn is engaged with a driven sprocket 42, the latter being nonrotatably secured to the shaft of the end roller 22. A second chain 43 is in engagement with the other drive sprocket 39, which chain 43 is in turn engaged with a further driven sprocket 44 which is nonrotatably secured to the end roller 23. In this embodiment, the sprockets 38 and 39 are of identical diameters, and the sprockets 42 and 44 are also of equal diameter, whereby the motor 36 causes simultaneous driving of the two end rollers 22 and 23, which end rollers are also of equal diameter and are thus driven with equal peripheral speeds.

The drive structure, namely the sprockets and the chains, are positioned adjacent but exteriorly of the sidewall 17. They are enclosed within a suitable cover or shroud 46 which is fixedly secured to the sidewall 17.

To ensure that the end rollers 22 and 23 both cause a simultaneous driving of the belt 13, and to positively prevent slippage of the belt on either of the end rollers, the belt is driven from the rollers 22 and 23 by means of a toothed driving connection. This toothed driving connection includes a drive gear 47 (FIG. 4) fixedly associated with each of the end rollers 22 and 23. This drive gear is in turn maintained in meshing engagement with a toothed gear rack 48 which is fixed to and extends throughout the length of the belt 13.

In the illustrated embodiment, as shown in FIG. 4, each roller 22 and 23 has an annular recess 49 formed therein, and the bottom of this recess 49 has teeth formed thereon, which teeth form the drive gear 47. The gear rack 48 provided on the belt 13 projects downwardly from the undersurface 51 of the belt and projects into the recess 49 so as to be in meshing engagement with the drive gear 47. This construction not only provides a positive driving connection between the belt 13 and each of the rollers 22 and 23, but it also provides an effective alignment structure which prevents the belt from slipping or moving sidewardly with respect to the rollers 22 and 23. This structure thus ensures that the belt tracks properly over the rollers and does not move sidewardly so as to unduly rub against the housing sidewalls.

While a positive (for example, a toothed) driving connection between the belt 13 and the rollers 22 and 23 is preferred so as to positively prevent slippage between the belt and the rollers, nevertheless such a positive driving connection is not necessary under all conditions of use. For example, where relatively light loads are imposed on the conveyor, then the teeth can be eliminated and a friction drive relied upon for driving the belt from the end rollers. The use of the teeth is, however, preferred in most situations where heavy loads are to be transported.

The belt 13 may also be provided with elongated rodlike cleats 52 fixed to the outer surface thereof, which cleats extend transversely across a major portion of the belt width. These cleats are of primary importance when the conveyor is provided with an inclined portion, inasmuch as the cleats assist in holding the objects in position on the belt as the belt moves upwardly through the inclined portion. Depending on the type of usage, the angle of inclination, and the nature of goods being transported, the use of such cleats is optional and the cleats may be eliminated in many use sitations.

As shown in FIG. 1, a deflector 53 in the form of a resilient plate is secured to the housing across the inlet end thereof, which plate projects downwardly and engages the upper surface of the belt in the vicinity of the end roller 22. This deflector 53 prevents articles which are deposited onto the belt from falling downwardly between the end roller and the housing.

OPERATION

In operation, articles or objects which are to be transported are deposited onto the upper surface of the horizontal belt portion 27. The belt 13 is driven from the motor 36, whereupon the belt 13 thus moves in the direction of the arrows so that the articles are carried leftwardly to the curved portion 29 and then upwardly along the inclined portion 28 until reaching the upper end roller 23. At this point, the articles are suitably discharged from the conveyor, as by being deposited into any other suitable apparatus, such as into a bin or onto a further conveyor.

During driving of the belt 13, the motor 36 drives both of the end rollers 22 and 23 in the same rotational direction at the same peripheral speed due to the dual driving connections provided by the chains 41 and 43. Since substantially equal driving forces are imposed on the belt 13 adjacent the opposite ends thereof, which forces are provided by the driving rollers 22 and 23, the upper belt reach 24 is substantially free of tension as caused by the driving forces. While it is obviously impossible to have zero tension in the belt, since some tension will occur due to the effect of gravity, nevertheless the tension in the upper belt reach is maintained at an absolute minimum. This lack of tension enables the belt to track freely on the rollers without encountering any substantial problem of misalignment. Further, even if the belt does not track in a straight manner, nevertheless the low tension in the belt minimizes the wear of the belt and prevents any undue wear of the belt due to the edges thereof rubbing against the sidewalls. Even this problem of belt tracking is substantially eliminated, however, when the conveyor is provided with the toothed guiding connection formed by the gear 47 and gear rack 48. This connection functions as an alignment structure for maintaining the belt properly guided on the rollers 22 and 23, and in addition prevents slippage between the belt and the driving rollers.

Due to the substantial absence of tension in the upper reach of the belt, the upper reach can be guided solely by the guide rails 31 and 32 which engage the horizontal and inclined portions of the belt, respectively. These guide rails 31 and 32 solely engage the undersurface of the belt. The upper surface of the belt, in the upper reach thereof, is totally free of any guide rails or slide surfaces. Further, the curved portion 29 does not require the use of any upper guide rails for maintaining the belt in the desired curvature, so that there is thus no wear of the upper belt surface. The desired curvature of the belt in the upper reach thereof is easily maintained solely due to the proper driving engagement of the belt with the rollers 22 and 23, which driving engagement provides the desired curvature in the upper reach, which curvature is then maintained since the upper reach is relatively free of tension.

MODIFICATIONS

While the invention illustrated in FIGS. 1-4 relates to an inclined conveyor wherein the end rollers 22 and 23 are disposed at different elevations, it will be appreciated that the present invention is also applicable to a horizontal conveyor wherein the upper belt reach is disposed within a single plane which is approximately horizontal. FIGS. 5 and 6 illustrate such a horizontal conveyor 61 therein, which conveyor has a housing 62 on which a movable endless belt 63 is supported. The housing is formed by opposed substantially parallel sidewalls 66 and 67 which are interconnected by substantially parallel and horizontally extending top and bottom walls 68 and 69, respectively.

A pair of end rollers 71 and 72 extend between and are rotatably supported on the opposed sidewalls, which end rollers are supported for rotation about axes which are parallel and extend substantially horizontally. The end rollers 71 and 72 are disposed in engagement with the conveyor belt 63 whereby the upper belt reach 73 is slidably supported on the upper surface of the top wall 68, whereas the lower belt reach 74 is disposed adjacent but spaced upwardly from the bottom wall 69.

The rollers 71 and 72 are normally of identical diameter and have drive sprockets 76 and 77, respectively, nonrotatably secured thereto. These drive sprockets in turn are driven by an endless driving element 78, specifically a chain, which in turn is driven by a driving sprocket 79 associated with a driving motor 81 which is disposed within the housing, as by being mounted on the undersurface of the top wall 68. This driving arrangement results in a positive driving of both rollers 71 and 72 at equal peripheral speeds whereby the upper belt reach 73 can be maintained relatively free of tension.

In this variation, the rollers 71 and 72 are preferably disposed in frictional engagement with the belt 63, which frictional engagement is assisted by providing the rollers with a conventional roughened surface. While the belt and rollers can be provided with a gear-type driving connection therebetween, such as in the embodiment of FIGS. 1-4, such a toothed driving connection is normally not necessary inasmuch as the loads carried by the upper reach are being moved horizontally so that a smaller driving torque is hence required.

The horizontal conveyor 61 of FIGS. 5 and 6 has the same advantages as the inclined conveyor 11 described above, in that it eliminates the necessity of complex adjustable alignment structure and also eliminates the problem of undesirable belt wear due to rubbing of the belt as caused by the high tension which normally exists in the belt of conventional horizontal conveyors. The horizontal conveyor of the present invention can also be positioned with the upper belt disposed within a plane which is slightly inclined with respect to the horizontal, if desired, so as to permit a slight change in elevation of the objects being transported.

Considering again the inclined conveyor 11 illustrated in FIGS. 1-4, the embodiment as described above involves a mode of operation wherein the end rollers 22 and 23 are simultaneously driven at equal peripheral speeds. However, it has been discovered that the operation of the inclined conveyor 11 can be still further improved by driving the lower end rollers 22 at a peripheral speed which is slightly greater than the peripheral speed of the upper end roller 23. For example, by driving the lower end roller 22 at a slightly higher speed, there is created a small amount of slack in the upper belt reach 24 so that the desired curvature of the upper belt reach is continuously maintained. When the lower end roller 22 is driven at a slightly greater speed than the upper roller 23, then the drive between the rollers 22 and 23 and the belt 13 is preferably a friction drive since this permits a limited amount of slippage to occur between the belt and one of the end rollers, thereby tending to compensate for the differential in the driving speeds between the end rollers.

In this variation of the invention, the lower end roller 22 is preferably driven at a speed such that its peripheral velocity is in the order of 5 to 10 percent greater than the peripheral velocity of the upper end roller 23. This difference in driving speed can be achieved by causing a slight variation in the two drive trains which interconnect the motor 36 to the end rollers 22 and 23. For example, the driving sprockets 38 and 39 may be identical, but the driven sprocket 42 is preferably provided with a slightly larger diameter or number of teeth than the driven sprocket 44 associated with the upper end roller. For example, the driven sprocket 42 can be provided with 13 teeth, whereas the driven sprocket 44 can be provided with 12 teeth. This thus results in the lower end roller 22 being rotated at a slightly greater rate than the upper end roller 23. Alternatively, the driven sprockets 42 and 44 can be identical, in which case the driving sprockets 38 and 39 are slightly different so as to achieve the desired speed differential between the upper and lower end rollers. It will be appreciated that numerous vairations could be made either in the diameter of the rollers themselves or in the driving and driven sprockets so as to achieve the desired speed differential between the upper and lower rollers.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a belt conveyor having a housing, first and second elongated rollers supported on said housing for rotation about substantially parallel horizontal axes, an endless flat belt supported on and extending between said rollers, said belt being of substantial width and having an outer surface adapted to support articles thereon as they are being moved by said conveyor, and a drive device interconnected to one of said rollers for moving said belt, comprising the improvement wherein:

said second roller is displaced horizontally from and vertically above said first roller;

said belt having a non-straight upper reach which extends between said first and second rollers, said upper reach including first and second elongated and substantially straight belt portions which extend at a substantial angle with respect to one another, said first belt portion being positioned adjacent said first roller and extending outwardly therefrom in a direction which is generally toward said second roller, said second belt portion being positioned adjacent said second roller and extending outwardly therefrom in a direction which is generally toward said first roller, said second belt portion also being inclined at a substantial angle with respect to the horizontal, and a curved belt portion interconnected between said first and second belt portions;

guide means mounted on said housing and disposed for guidably supporting the upper reach of said belt as it extends between said first and second rollers, said guide means engaging the undersurface of said upper reach so that as it extends between said first and second rollers it is supported solely by the guidable engagement of the undersurface thereof with said guide means;

said drive device causing simultaneous rotation of said first and second rollers in the same rotational direction for causing movement of the upper reach of said belt in a direction from said first roller toward said second roller so that articles supported on said upper reach are moved upwardly by said second belt portion; and said drive device including a common drive motor, a second power train drivingly connected between said motor and said second roller for causing rotation thereof at a selected peripheral speed, and a first power train drivingly connected between said motor and said first roller for causing rotation thereof at a peripheral speed which is at least equal to said selected peripheral speed, whereby the upper belt reach is substantially free of tension and is maintained in a desired non-straight configuration due to said upper reach being supported solely by said first and second rollers and said guide means so that said upper belt reach does not require the use of any guiding structure disposed in engagement with the upper surface thereof.

2. A conveyor according to claim 1, including positive drive means cooperating between said belt and each of said rollers for preventing slippage of said belt with respect to said rollers, said positive drive means including a continuous gear rack fixed to the undersurface of said belt and extending peripherally therearound, and a gear fixedly associated with each of said rollers and disposed in meshing engagement with said gear rack.

3. A conveyor according to claim 1, wherein each said roller has an annular recess formed therearound, and said gear being associated with the bottom of said recess, the gear rack on said belt projecting into said annular recess for preventing sideward displacement of said belt with respect to said rollers.

4. A conveyor according to claim 1, further including alignment means coacting between said belt and said rollers for preventing sideward displacement of said belt with respect to said rollers, said alignment means including annular groove means on said rollers and projection means fixed to said belt and projecting downwardly from the under side thereof, said projection means extending into the annular groove means on said rollers.

5. A conveyor according to claim 1, wherein the peripheral velocity of said first roller is a maximum of about 10 percent greater than the peripheral velocity of said second roller.

6. A conveyor according to claim 1, wherein said guide means includes a first elongated guide fixedly associated with said housing and projecting substantially horizontally away from said first roller so that said first belt portion is slidably supported on said first guide and extends substantially horizontally, said guide means also including a second elongated guide which is substantially planar and is fixed with respect to said housing, said second guide extending outwardly and downwardly away from said second roller so as to be inclined with respect to the horizontal, said second belt portion being slidably supported on said second guide.

7. A conveyor according to claim 1, wherein said first power train causes said first roller to be rotatably driven at a peripheral velocity which is slightly greater than said preselected velocity.

8. A conveyor according to claim 1, wherein said first power train comprises a first positive drive-type endless driving member extending between and drivingly connected to said motor and said first roller, and said second power train comprising a second positive drive-type endless member extending between and drivingly connected to said motor and said second roller.

9. In a belt conveyor having a housing, first and second elongated rollers supported on said housing for rotation about substantially parallel horizontal axes, an endless flat belt supported on and extending between said rollers, said belt being of substantial width and having an outer surface adapted to support articles thereon as they are being moved by said conveyor, and a drive device interconnected to one of said rollers for moving said belt, comprising the improvement wherein:
said second roller is displaced horizontally from and vertically above said first roller;
said belt having an upper belt reach which extends between said first and second rollers, said upper belt reach including an elongated and substantially straight belt portion which extends outwardly from said second roller in a direction which is generally toward said first roller, said belt portion as it extends away from said second roller being inclined downwardly at a substantial angle with respect to the horizontal;
guide means mounted on said housing and disposed for guidably supporting the upper reach of said belt as it extends between said first and second rollers, said guide means engaging the under surface of said upper reach so that as it extends between said first and second rollers it is supported solely by the guidable engagement of the under surface thereof with said guide means, said upper belt reach as it extends between said first and second rollers having the upper surface thereof free of engagement with any guiding or supporting structure;
said drive device causing simultaneous rotation of said first and second rollers in the same rotational direction for causing movement of the upper reach of said belt in a direction from said first roller toward said second roller so that articles supported on said upper reach are moved upwardly by said belt as they are moved toward said second roller; and
said drive device including a common drive motor, a first power train drivingly connected between said motor and said first roller for causing rotation thereof, a second power train drivingly connected between said motor and said second roller for causing rotation thereof at a preselected peripheral speed, each of said first and second power trains being of the positive drive type, and said first power train drivingly rotating said first roller at a peripheral speed which is at least equal to said preselected peripheral speed, whereby the upper belt reach is substantially free of tension as it extends between said first and second rollers and is maintained in its desired configuration due to said upper belt reach being supported solely by said first and second rollers and said guide means engaging the undersurface of said upper reach.

10. In a belt conveyor having a housing, a first elongated roller supported on said housing adjacent the rear end thereof for rotation about a substantially horizontal axis, a second elongated roller supported on said housing adjacent the front end thereof for rotation about a substantially horizontal axis, said first and second rollers being disposed with their axes substantially parallel but horizontally spaced from one another, an endless flat belt supported on and extending between said rollers, said belt being of substantial width and having an upper reach extending between said first and second rollers which is adapted to support articles on the outer surface thereof, and a drive device interconnected to at least one of said rollers for moving said belt in a direction whereby the upper reach is moved from said first roller in a direction toward said second roller, comprising the improvement wherein;
said housing includes substantially planar guide means disposed for slidably supporting the upper reach of said belt as it extends between said first and second rollers;
said drive device being drivingly interconnected directly to both of said first and second rollers for causing said first roller to be rotated at a peripheral speed which is at least equal to the rotational peripheral speed of said second roller to thereby maintain the upper reach of said belt substantially free of tension as it extends between said first and second rollers, whereby the desired profile of said upper reach is maintained due to said upper reach being slidably supported by said guide means;
said drive device including a common motor mounted on said housing and having a toothed driving member associated therewith, and first and second toothed driven members respectively connected to said first and second rollers; and
said drive device further including a positive drive power train means drivingly connected between said driving member and each of said driven members for positively driving each of said driven members and the respective rollers, said positive drive power train means including a positive drive-type endless member.

11. A conveyor according to claim 10, wherein said motor is positioned between the upper and lower reaches of the belt, said endless member extending between and being in driving engagement with each of said driven members, and said driving member also being in engagement with said endless member.

* * * * *

UNITED STATES PATENT AND TRADEMARK OFFICE
CERTIFICATE OF CORRECTION

PATENT NO. : 4 050 575

DATED : September 27, 1977

INVENTOR(S) : John H. Rossio

It is certified that error appears in the above-identified patent and that said Letters Patent are hereby corrected as shown below:

Column 8, line 47; change "Claim 1" to ---Claim 2---.

Signed and Sealed this

Seventh Day of February 1978

[SEAL]

Attest:

RUTH C. MASON
Attesting Officer

LUTRELLE F. PARKER
Acting Commissioner of Patents and Trademarks